United States Patent [19]
Lacan

[11] 3,909,502
[45] Sept. 30, 1975

[54] COLUMN FOR ELECTRICAL SUPPLY CABLES

[75] Inventor: Guy H. Lacan, le Mesnil-le-Roi, France

[73] Assignee: Technilec, Gonesse, France

[22] Filed: July 11, 1974

[21] Appl. No.: 487,797

[30] Foreign Application Priority Data
July 19, 1973 France .............................. 73.26488

[52] U.S. Cl. ...................... 174/48; 52/732; 174/97; 174/100
[51] Int. Cl.² ......................................... H02G 3/04
[58] Field of Search...... 174/48, 49, 38, 45 R, 68 C, 174/70 R, 95, 97, 100, 101; 52/220, 221, 732, 730

[56] References Cited
UNITED STATES PATENTS

| | | | |
|---|---|---|---|
| 3,082,290 | 3/1963 | Ohmit | 174/49 |
| 3,609,211 | 9/1971 | Van Herk | 174/49 |
| 3,696,569 | 10/1972 | Didry | 52/732 X |
| 3,781,567 | 12/1973 | Papsco | 174/48 X |

*Primary Examiner*—J. V. Truhe
*Assistant Examiner*—David A. Tone
*Attorney, Agent, or Firm*—Waters, Schwartz & Nissen

[57] ABSTRACT

A distribution and connection column for electrically conductive cables comprising a beam having a central web and two pairs of flanges extending on opposite sides of the web. A median zone of the web is formed as a U-section with flanges which are parallel to the flanges of the beam, and the lateral extension of these flanges is less than that of the flanges of the beam. There is thus formed two longitudinally extending channels each adapted for receiving electrically conductive cables, the first channel being located inside the U-section of the web, and the second channel defined partly by the web and one pair of flanges of the beam, and partly by the U-section of the web.

10 Claims, 8 Drawing Figures

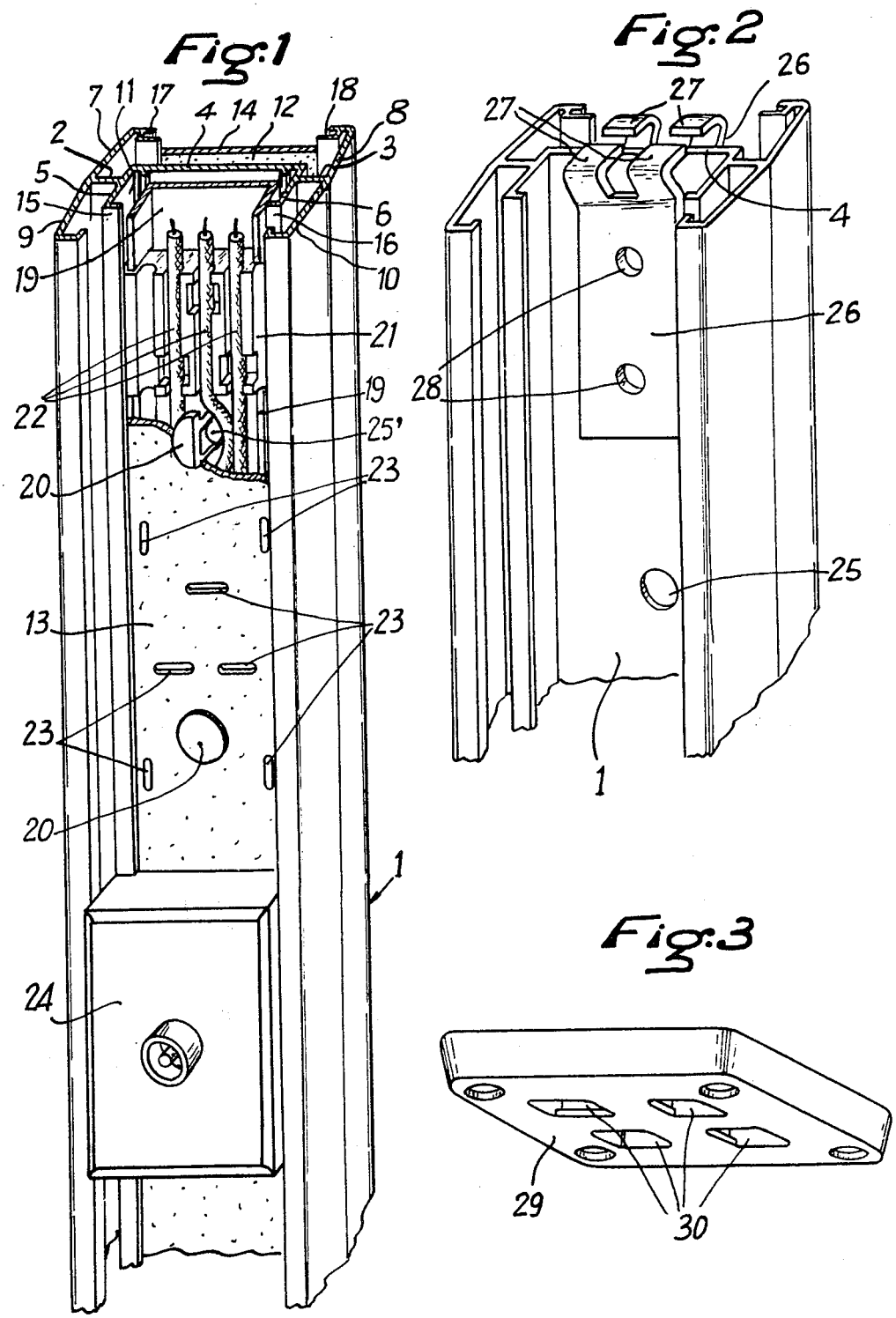

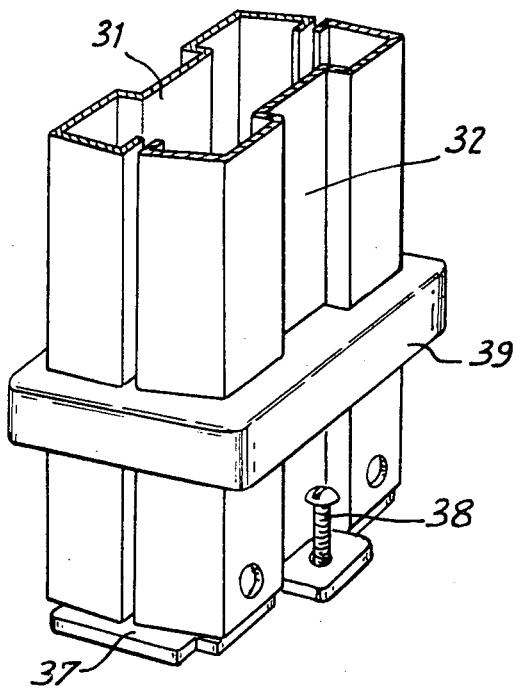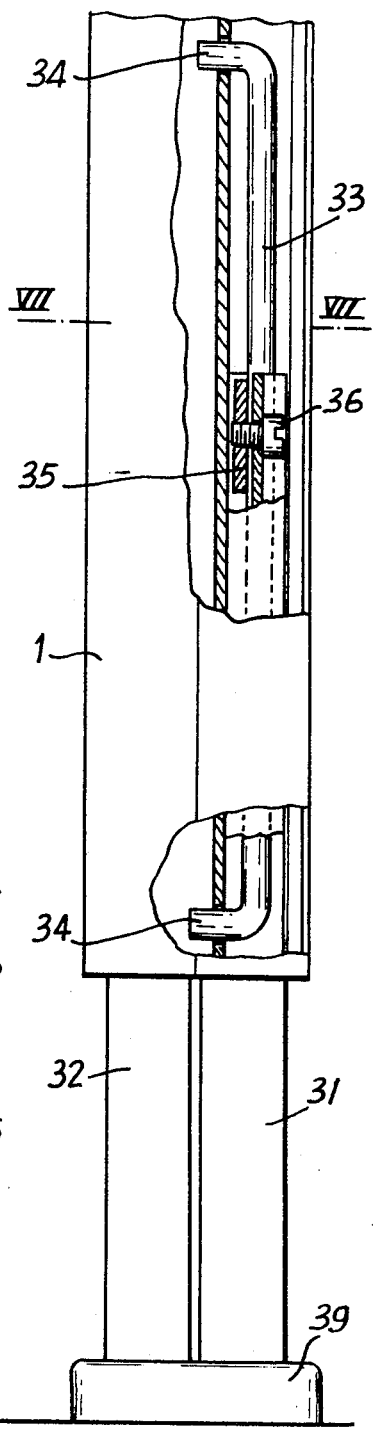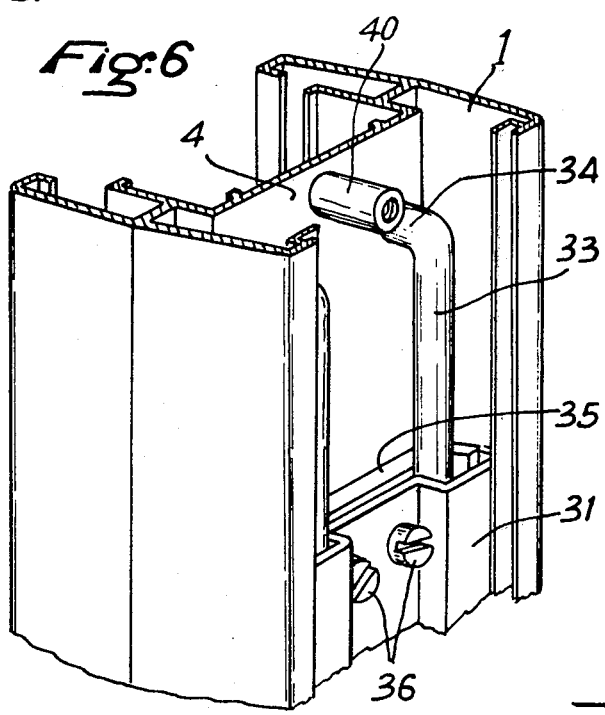

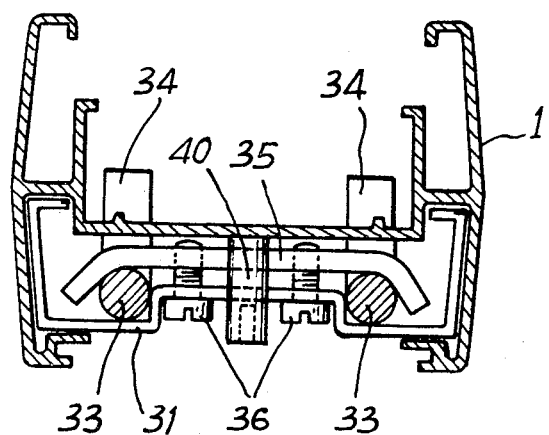
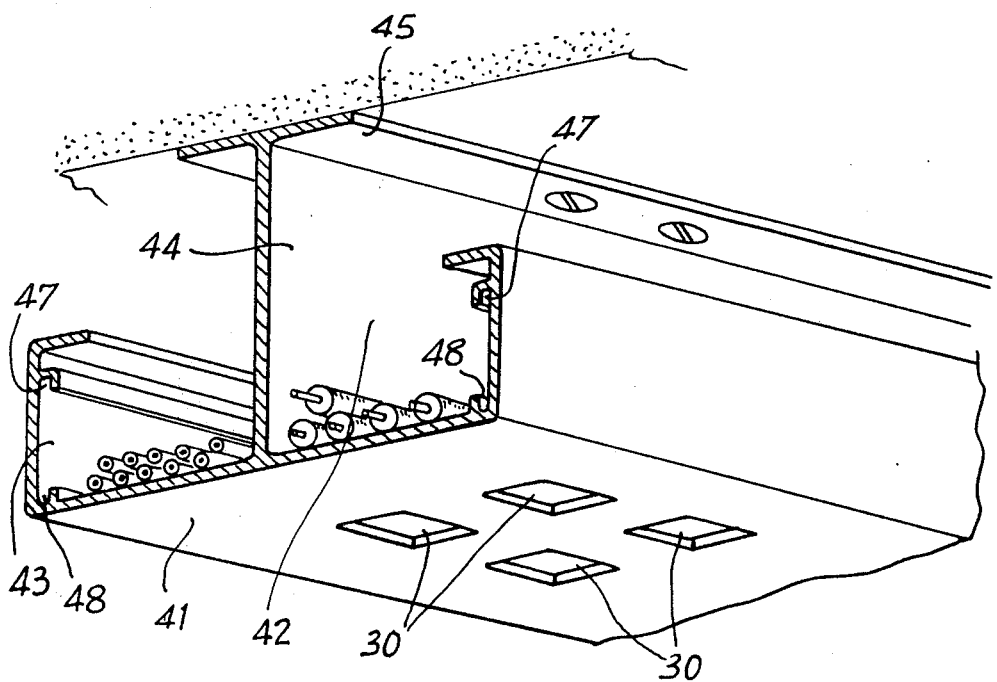

COLUMN FOR ELECTRICAL SUPPLY CABLES

BACKGROUND OF THE INVENTION

The invention relates to a distribution and connection column for electrical supply cables and conductors. It also relates to an assembly consisting of such columns mounted vertically and connected by horizontally disposed conduits.

The development of large open, non partitioned administrative work areas in which free circulation is possible, such as bank or office halls of the open plan type, gives rise to the problem of supplying the working stations with electricity and with cables of all kinds such as telephone, signal, alarm and remote control cables, and connections to various terminals, aerial lead-ins, etc.

SUMMARY OF THE INVENTION

It is an object of the invention to solve the problem of supplying work stations with electric cables and conductors by utilising standard elements which are easy and economical to install and to remove, which leaves no trace after removal, offer various possible orientations, and which have a pleasant appearance. It is a further object of the invention to provide users with an arrangement of rapid connection socket outlets for the different appliances which are to be connected to the conduits.

According to the invention these objects are achieved by the provision of one or more vertical columns for receiving electrically conductive cables such as electrical supply cables and signal transmission cables for installation in a room having a floor and a ceiling.

Each of the columns comprises a beam having in section two pairs of flanges extending on two opposite sides of a central web. The median zone of the web of these columns is itself a U-section, the flanges of which are parallel to the flanges of the beam. The extension of the flanges of this U-section are less than the flanges of the beam. In this way, the latter forms two separate longitudinally extending casings for receiving the cables; a first casing is situated inside the U-section, and a second casing is bounded partly by the web and one pair of flanges of the beam, and partly by the U-section.

The ends of the flanges of the U-section are preferably provided with means for receiving a cover having spaced perforations for fastening connectors.

It is advantageous to provide apertures spaced in the longitudinal direction in the central portion of the U-section. Thus, one casing is reserved for the electric power conductor cables and the other for the signal transmission cables, the aperture serving as means of communication between the two casings.

The column may be provided with transverse locking means and with means for the adjustment and fixing of its height.

It is advantageous for the casing or casings not provided with a cover suitable for receiving connection means nevertheless to be closed by a removable cover.

The invention also provides a combination of at least one of the aforesaid columns with one or more horizontal conduits adapted to receive the electrically conductive cables.

A distribution system in a room may for example comprise a plurality of columns supplied by horizontal conduits. In the case of old buildings the horizontal conduits are composed of beams having two channels and provided with fastening and passage apertures at the positions intended for the columns.

BRIEF DESCRIPTION OF THE DRAWINGS

FIG. 1 is a view in perspective of a column according to the invention, with the front cover partly broken away and with an insulated cross-member in longitudinal section;

FIG. 2 is a view of the same column, showing one of the transverse locking elements;

FIG. 3 is a view of a locking element which cooperates with the locking element shown in FIG. 2;

FIG. 4 is a perspective view of part of the height adjustment elements;

FIG. 5 is a side view, partly broken away, of the column of FIG. 1 with its height adjustment and fastening means;

FIG. 6 shows on a larger scale and in perspective a detail of the column shown in FIG. 5;

FIG. 7 is a view in section taken along the line VII—VII in FIG. 5; and

FIG. 8 is a view of one form of horizontal conduit which forms part of a distribution system according to the invention.

DESCRIPTION OF THE PREFERRED EMBODIMENTS

Referring to the drawings, a beam 1 has in section a web and two pairs of flanges 7,8 and 9,10 which are substantially symmetrical in relation to the web. The latter has two parts 2,3 situated one on each side of a median zone, which is itself a U-section 4. This U-section 4 has flanges 5,6 which are parallel to the flanges of the beam 1. These flanges 5,6 have a smaller extension than that of the flanges 9,10 of the beam 1. In this manner the latter forms two separate longitudinal casings 11 and 12. The first casing 11 is situated inside the U-section 4; the second casing 12 is bounded partly by the back of the section 4, by the remainder 2,3 of the web, and by the two flanges 7,8 of the beam 1.

Each of the flanges 5 and 6 has a slight return 15,16, so that the casing 11 can receive a cover 13 engaging over the electric conduits. The casing 11 will contain insulated conductors 22, mounted for example on insulating blocks 21 of the kind described in French Patent Application No. 72.21156. The cover is held at a distance by the flanges of an insulating section 19 and positioned by the blocks 21, as known from the aforesaid French Patent Application, and is arranged to receive distribution elements, such as socket outlets or connections, as described for example in the aforesaid French Patent Application No. 72.21156, in French Pat. No. 2,097,279 and in French Patent Applications Nos. 72.21155 and 72.21157. This possibility has been summarily illustrated by showing holes 23 in the cover 13, namely four holes for fastening a socket outlet receiving current from the conductors 22 by means of the prongs described in French Pat. No. 2,097,279 passing through three of the holes 23, and a coaxial junction box 24 fastened by four other holes 23 which are not visible. With each set of four fastening holes 23 is associated a circular hole in the cover which is adapted to receive the insulating crossmembers 20 described later on, these members subsidiarily contributing towards the positioning of the cover 13.

The central portion of the web is provided from place to place with apertures 25 permitting communication between the rear casing 12 and the front face of the cover 13 through the insulating cross-members, the rear aperture of which is contiguous with the edge of the apertures 25 and the front face of which is provided with a detachable cover. The insulating section 19 is provided with apertures 25' facing the apertures 25. The central conductor 22 passes around each cross-member 20. The casing 12 is advantageously closed by a cover 14 engaged in two slots 17,18 in the flanges 7,8 and fixed by known means, for example by screws screwed into threaded holes in the fastening studs 40 carried axially by the central portion of the web 4. This cover is detachable and can therefore easily be removed.

The casing 12 is intended to serve as a conduit for signal transmission cables: telephone, signalling, alarm, remote control, connection to various terminals, aerial lead ins, etc. It is then possible to make connections to these cables by passing them through the insulating cross-members 20 in such a manner that they pass transversely through the casing 11 with perfect insulation and lead to a junction box 24 suitable for each particular purpose, or else simply passing through the cover 13 before reaching a neighbouring apparatus. This second alternative is less advantageous except in cases where an additional connection may harm the quality of the signal. Without departing from the scope of the invention it is possible to bring these cables through the cover 14 or to fasten a rapid connection means on the said cover, although preference is given to the grouping together of all the connections on the front face, where a cover 13 suitable for all connections is provided.

Without departing from the scope of the invention it is also possible for an oversize apparatus requiring local elimination of the cover to be engaged in the casing 11. Thus, it may be advantageous for a cut-out protecting the conductors 22 to be fitted at the top of the casing 11, the extent of the cover 13 then being limited to contact with the cut-out.

It can be seen that the assembly composed of the beam 1, its equipment, and the covers 13,14 constitutes a distribution and connection column for electric cables and conductors which provides numerous advantages.

It is now necessary to explain how this column can be installed in a room and how it can be connected to these networks.

For the purpose of installing this column transverse locking means and means of adjustment and locking in height are provided.

In order to secure it transversely, it is possible to provide, as shown in FIG. 2, elements 26 provided with claws, each comprising two claws 27 and being fixed by screws through holes 28. At the top end of the center 4 of the web two elements 26 provided with claws are fastened so as to project. These claw elements are so designed that they can be fastened to the wall of the central portion 4 of the web with the claws either outside or inside, thus permitting various combinations of orientation in order to engage the said claws in a set of four square apertures 30 disposed in a square in the ceiling, while leaving in these apertures a sufficient passage for grommets guiding the conductors, wires, and cables. The apertures 30 may be carried by a load element embedded in the ceiling, such as the element 29 shown in FIG. 3. In addition, the securing device described provides the advantage that each column can be fixed in accordance with any of four orientations.

In order to enable the column of the invention to be adjusted and secured in height, it is advantageous to utilise profiled elements 31, as illustrated in FIGS. 4, 5, 6, and 7. These profiled elements are designed to slide inside the rear casing 12, with the inner walls of which they are in contact on at least two contact lines. For the purpose of likewise enabling another profiled element 32, identical with the element 31, to be engaged, the two flanges 9,10 are provided on the front face of the column. These two flanges may likewise be used to fasten accessories, such as lighting fittings.

Two profiled elements 31,32 are therefore inserted at the base of the column on each side of the web 2,3,4. Assembly, adjustment, and fastening are effected by means of two bores 33 the ends of which are bent to form right-angles 34. These ends are introduced through the rear of the beam 1 into holes provided during manufacture. A slide 35 embraces the bars 33. Two screws 36 passing through the profiled element 31 are received in the two tapped holes in the slide 35 and when tightened enable the bars 33, held by the beam 1, to be locked against the profiled element 31, thus effecting the complete fastening of the beam 1 and the profiled element 31.

It is then sufficient for the profiled elements 31,32 to be engaged and fixed in a fastening base 37 and for the latter to be fastened to the ground by screws 38 to permit easy adjustment of the height of the column previously locked by the claw elements 26, and to secure it by tightening the screws 36. In the case described, the profiled element 32 is not fastened directly to the beam 31, but element 32 may participate in stiffening by being fastened to the profiled element 32 by the fastening base 37.

The cover 14 engaged in slots 17,18 in the flanges 7,8 of the rear casing, being detachable, permits access to the screws 36 and enables them to be concealed after being tightened. At least one sliding ring 39 surrounds the pair of profiled elements 31,32 in their portion which is not engaged by the beam 1. This ring 31 serves in particular to conceal the base and its fastening screws. Another ring may serve to lock the sliding cover 14 in the downward direction.

In a room, particularly in an office of the open plan type, a large number of work stations can be equipped by serving them with the aid of the columns of the invention, which are fastened between the floor and the ceiling.

These columns can be connected to electrical supply conduits and transmission cable conduits circulating under the ceiling in separate casings of types known per se, by fastening elements 29 to the ceiling (see FIG. 3).

When however it is required to equip old premises, the invention provides for the conductors and cables to be brought horizontally to each column by means of I-section conduits 41 having a vertical central partition 44 constituting the web, with a top flange 45 having a flat upper surface capable of being fastened to the ceiling. The bottom flange has raised end edges which together with the web 44 form two channels 42, 43. At suitable distances the beam carries series of four square holes 30 disposed in a square straddling the partition 44 and in communication with the channels 41,42. These holes 30 can receive the claws 27 and serve for the passage of the lines through grommets, as explained in connection with FIGS. 2 and 3. These holes 30 also serve for the passage of a screwdriver for the purpose of fastening the conduit to the ceiling by its flange 45.

If the conduit 41 is of metal it may be advantageous to obtain electrical continuity at the junctions by means of two grooves 47,48 into which elastic metal connectors are inserted by force on each side of the break.

I claim:

1. A distribution and connection column for electrically conductive cables, comprising a beam having in section a central web, and two pairs of flanges extending on two opposite sides of the central web, the median zone of the web being formed as a U-section having flanges which are parallel to the flanges of the beam, the lateral extension of the flanges of the U-section being less than that of the flanges of the beam, and the beam thus forming two separate longitudinally extending casings for receiving said cables, the first casing being located inside the U-section, and the second casing being defined partly by the web and one pair of flanges of the beam, and partly by the U-section.

2. A column according to claim 1, wherein the ends of the flanges of the U-section defining the first casing are provided with positioning means for the positioning of a cover having spaced perforations for the fastening of connectors.

3. A column according to claim 2, wherein electrical current conductors are located in one of the casings and signal transmission cables are located in the other, and apertures spaced in the longitudinal direction are provided in the central portion of the web to serve as communication means between the two casings, and a cover for the first casing is provided located by said positioning means, said cover including connectors adapted for connection to the electric current conductors and to the signal transmission cables.

4. A column according to claim 3, wherein the electric current conductors are disposed in the first casing and the connectors are adapted to receive connecting prongs.

5. A column according to claim 1, wherein the two pairs of flanges of the beams are substantially symmetrical in relation to the web and the column is provided with height adjusting means for adjusting and fixing the height thereof, these means comprising two profiled adjustment elements whose external profile matches at least partly the internal profile defined by the two pairs of flanges and the portion of the web situated outside the U-section, each of these profiled adjustment elements being adapted to slide on each side of the web of the beam and being provided with two flanges connected by a base which closes the gap existing between the ends of the two pairs of flanges of the beam.

6. A column according to claim 5, wherein the column includes fastening means comprising at least one rod disposed in the gap between the web of the beam and each profiled adjustment element, this rod being attached to either of the two elements comprising the beam and the profiled adjustment element and locked on the other element by a clamping means accessible from outside, the free end of the two profiled adjustment elements being engaged with a base for fastening to the floor.

7. A column according to claim 6, wherein the profiled adjustment elements are arranged outside their zone of engagement with the beam, in a one-piece ring which closely surrounds them and which is adjustable in position.

8. A column according to claim 1, wherein the column is provided at its upper end with claw elements fastened face to face on each side of the central web and which are provided with claws projecting from the end of the beam, and an element is provided for fastening to a ceiling having apertures into which the claws can be introduced, the claws and the apertures being disposed concentrically at regular angular intervals in such a manner that the column can be secured against rotation in any of several possible angular positions.

9. An assembly comprising at least one column as claimed in claim 1, in combination with a horizontal conduit adapted to receive electrically conductive cables and means connecting said horizontal conduit to said column.

10. An assembly according to claim 9, wherein the column is connected by said connecting means at its upper end to said horizontal conduit, and said conduit comprises an I-section beam having a vertical central partition constituting the web, an upper flange having a flat upper surface for fastening to a ceiling, and a lower flange the longitudinal edges of which are directed upwardly towards the upper flange and which define, with the central partition, two parallel channels separated by said partition and adapted to receive said cables.

* * * * *